(12) United States Patent
Lee et al.

(10) Patent No.: US 9,531,820 B2
(45) Date of Patent: Dec. 27, 2016

(54) CONTENTS PROVIDING SCHEME USING IDENTIFICATION CODE

(75) Inventors: Sang-Bum Lee, Goyang-si (KR); Chang-Seuk Ok, Seongnam-si (KR); Hye-Mi Kim, Seoul (KR); Se-Cheol Park, Incheon (KR); Joo-Young Yoon, Seoul (KR)

(73) Assignee: KT Corporation, Seongnam (KR)

( * ) Notice: Subject to any disclaimer, the term of this patent is extended or adjusted under 35 U.S.C. 154(b) by 136 days.

(21) Appl. No.: 13/540,232

(22) Filed: Jul. 2, 2012

(65) Prior Publication Data

US 2014/0006402 A1 Jan. 2, 2014

(51) Int. Cl.
*G06F 17/30* (2006.01)
*H04L 29/08* (2006.01)
*H04L 29/12* (2006.01)

(52) U.S. Cl.
CPC ........... *H04L 67/18* (2013.01); *H04L 67/1063* (2013.01); *H04L 61/1582* (2013.01)

(58) Field of Classification Search
CPC .................. G06F 17/30598; G06F 17/30705; G06F 17/3071; G06F 17/30864; G06F 17/30265
USPC ....................................................... 707/737
See application file for complete search history.

(56) References Cited

U.S. PATENT DOCUMENTS

| | | | |
|---|---|---|---|
| 6,763,496 B1* | 7/2004 | Hennings et al. | 715/205 |
| 2002/0161745 A1* | 10/2002 | Call | 707/1 |
| 2004/0172376 A1* | 9/2004 | Kobori et al. | 707/1 |
| 2005/0010475 A1* | 1/2005 | Perkowski | G06Q 30/02 705/14.51 |
| 2006/0011720 A1* | 1/2006 | Call | 235/383 |
| 2006/0293964 A1* | 12/2006 | Akihata | 705/26 |
| 2009/0241107 A1* | 9/2009 | Kobayashi | 717/178 |
| 2010/0057557 A1* | 3/2010 | Yoo | 705/14.45 |
| 2013/0110839 A1* | 5/2013 | Kirshenbaum | 707/740 |

FOREIGN PATENT DOCUMENTS

| | | |
|---|---|---|
| KR | 20050106659 A | 11/2005 |
| KR | 20060016987 A | 2/2006 |

OTHER PUBLICATIONS

Kim, Young-Sun, WO 2008041815 A1, Digital Contents Registration and Distribution System and Its Method Using Contents Identification System Based on Unified Resource Names, Oct. 4, 2008, pp. 44.*

* cited by examiner

*Primary Examiner* — Cam-Y Truong
(74) *Attorney, Agent, or Firm* — Sughrue Mion, PLLC

(57) ABSTRACT

A contents distribution server using an identification code of contents is disclosed. The apparatus includes an interface providing unit configured to provide an interface for registration of the contents to a device, if a request for the registration of the contents is received from the device; an code information extraction unit configured to extract code information from input information through the interface; an identification code generation unit configured to generate the identification code by combining codes corresponding to the extracted code information, and a contents distribution unit configured to match the contents with the generated identification code, register the matched contents in a database and transmit the registered contents to a contents managing server with reference to the identification code.

4 Claims, 6 Drawing Sheets

CONTENTS PROVIDING SCHEME USING IDENTIFICATION CODE

BACKGROUND

1. Field

Methods and apparatuses consistent with exemplary embodiments relate to a method and an apparatus for providing contents, in particular, a method and an apparatus for providing the contents by using an identification code.

2. Description of the Related Art

Recently, with the development of wired and wireless communication technologies and the diffusion of network infra-structures, contents providers who produce and provide contents demanded by users are increasing. Users can be provided with contents from the contents providers by using various user devices such as smart phones, cellular phones, personal digital assistants (PDAs), desk top PCs, and laptop PCs through various routes, e.g., a local area network (LAN), a radio-frequency identification (RFID), a quick response-code (QR-CODE), a ubiquitous sensor network (USN), a wireless LAN (WLAN), a bluetooth, and a zigbee.

Under the circumstances, contents providers have a burden of managing contents that correspond to the above-described various routes and user devices. In order to solve the problem, there has been suggested a method of managing contents by assigning a meaning-based code to each of contents.

However, if there are a multiple number of management systems by contents, or a new meaning-based code system is produced, analysis information therefor needs to be updated. If a single system has a multiple number of code analysis information to provide services, a server could undergo heavy loads, or traffic loads should be resolved.

SUMMARY

An illustrative embodiment provides a method and an apparatus capable of distributing and managing a significant amount of contents by using an identification code.

According to a first aspect of an exemplary embodiment, there is provided a contents distribution server using an identification code of contents. The contents distribution server includes an interface providing unit configured to provide an interface for registration of the contents to a device, if a request for the registration of the contents is received from the device, a code information extraction unit configured to extract code information from input information through the interface, an identification code generation unit configured to generate the identification code by combining codes corresponding to the extracted code information, and a contents distribution unit configured to match the contents with the generated identification code, register the matched contents in a database and transmit the registered contents to a contents managing server with reference to the identification code.

The interface may include at least one from among a plurality of check boxes to be selected and input boxes into which information is input.

The identification code generation unit may generate a first identification code group and a second identification code group, and the identification code may include the first identification code group and the second identification code group.

The first identification code group may include at least one from among available device information for the registered contents, personal identification information, kind information of the registered contents and location information on the contents managing server storing the registered contents. The identification code generation unit may assign a bit length for the kind information based on a number of categories.

The second identification code group may include at least one from among the country information, territory information, company information where the registered contents are produced, contents provider information on a contents provider which provides the registered contents, and contents identification information.

The location information may include at least one from among a name, an Internet protocol (IP) address, a port number, and a uniform resource locator (URL) of the contents managing server.

According to a second aspect of an exemplary embodiment, there is provided a contents distribution server for providing a location of contents by using an identification code of the contents. The contents distribution server includes a first identification code group analysis unit configured to extract and analyze a first identification code group included in a request signal when receiving the request signal related to location information from a device, a second identification code group analysis unit configured to extract and analyze a second identification code group included in the request signal and a contents location providing unit configured to search a location of the contents based on the analyzed first identification code group and the analyzed second identification code group, and transmit the location to the device.

The first identification code group may include at least one from among available device information for contents, personal identification information and kind information of the contents, and the first identification code group analysis unit may compare the first identification code group with identification codes stored in a database, find location information on a contents managing server storing the contents based on the comparison, and transmit the location information to the contents location providing unit.

The second identification code group may include at least one from among country information, territory information, company information where the contents are produced, and contents provider information on a contents provider which provides the contents, and the second identification code group analysis unit may compare the second identification code group with identification codes stored in a database, find contents identification information based on the comparison, and transmit the contents identification information to the contents location providing unit.

The location information may include a location of a contents managing server storing the contents, and the contents location providing unit may transmit at least one from among a name, and Internet protocol (IP) address, a port number, and a uniform resource locator (URL) of the contents managing server to the device.

According to a third aspect of an exemplary embodiment, there is provided a method for providing contents by using an identification code of the contents. The method includes extracting code information from input information when receiving the input information from a registration device for registration of the contents, and generating the identification code based on the code information and matching the contents with the generated identification code, registering the matched contents in a database, and transmitting the registered contents to a contents managing server with reference to the identification code.

The identification code may comprise a first identification code group and a second identification code group, wherein the first identification code group includes at least one from among available device information for the registered contents, personal identification information, kind information of the registered contents, and location information on the contents managing server storing the registered contents. A bit length may be assigned for the kind information based on a number of categories.

The second identification code group may include at least one from among country information, territory information, company information where the registered contents are produced, contents provider information on a contents provider which provides the registered contents, and contents identification information.

According to a third aspect of an exemplary embodiment, there is provided a method for providing a location of contents by using an identification code of the contents, the method comprising: extracting and analyzing a first identification code group included in a request signal when receiving the request signal related to a location of contents from a device; extracting and analyzing a second identification code group included in the request signal; and searching the location of the contents based on the analyzed first identification code group and the analyzed second identification code group, and transmitting the location to the device.

The first identification code group may include at least one from among available device information for contents, personal identification information and kind information of the contents, and the method may further comprise comparing the first identification code group with identification codes stored in a database, finding location information on a contents managing server storing the contents based on the comparison, and transmitting the location information.

The second identification code group may include at least one from among country information, territory information, company information where the contents are produced, and contents provider information on a contents provider which provides the contents, and the method may further comprise comparing the second identification code group with identification codes stored in a database, finding contents identification information based on the comparison, and transmitting the contents identification information.

The location information may include a location of a contents managing server storing the contents, and the method may further comprise transmitting at least one from among a name, an internet protocol (IP) address, a port number, and a uniform resource locator (URL) of the contents managing server to the device.

According to exemplary results of the method and the apparatus for providing contents using an identification code in the illustrative embodiment, distribution and management of contents are accomplished, so that one-source-multi-use can be realized.

If it is necessary to provide contents customized for a future new device, existing contents can be used.

Furthermore, the illustrative embodiment can be cooperated with conventional codes such as a RFID code or an object identifier (OID), and applied to a solution considering expandability and compatibility.

BRIEF DESCRIPTION OF THE DRAWINGS

Non-limiting and non-exhaustive exemplary embodiments will be described in conjunction with the accompanying drawings. Understanding that these drawings depict only several exemplary embodiments and are, therefore, not to be intended to limit its scope, the disclosure will be described with specificity and detail through use of the accompanying drawings, in which.

DETAILED DESCRIPTION OF EXEMPLARY EMBODIMENTS

Figure 1:
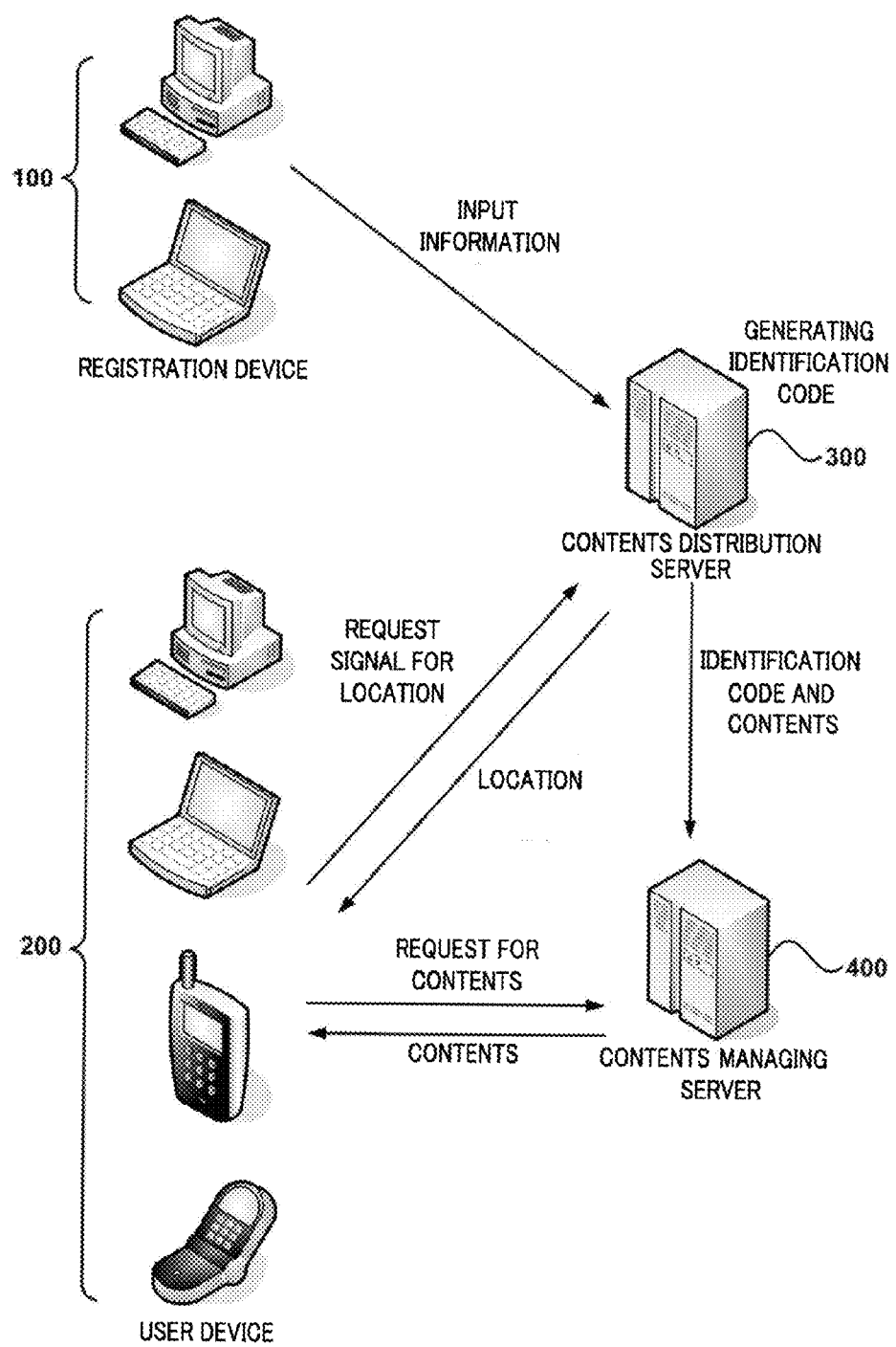
FIG. 1 illustrates a configuration of a system for providing contents by using an identification code according to an exemplary embodiment.

Hereinafter, illustrative embodiments will be described in detail with reference to the accompanying drawings so that the exemplary embodiments may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

Hereinafter, the illustrative embodiment will be explained in detail with reference to the accompanying drawings.

FIG. 1 illustrates configuration of a system for providing contents by using an identification code according to an exemplary embodiment.

The system for providing contents by using an identification code according to an exemplary embodiment includes a registration device 100, a user device 200, a contents distribution server 300, and a contents managing server 400.

With regard to each of the components, the registration device 100 is connected to the contents distribution server 300 to register contents.

In this case, the registration device 100 receives an interface for registration of contents from the contents distribution server 300. The registration device 100 transmits contents registration information input from a contents provider through the interface to the contents distribution server 300.

Here, the interface for registration of the contents may include a plurality of check boxes to be selected and/or input boxes into which information is input. The input information may include at least one of available device information for the contents, personal identification information, kind information of the contents and location information on the contents managing server storing the contents.

Here, the location information may include a name, an IP address, a port number, URL, and others of a contents managing server 400 that stores the contents.

The input information may further include at least one of country information, territory information, company information where the contents are produced and contents provider (CP) information on a contents provider which provides the registered contents.

In order to use (streaming transmission or download) the contents, the user device 200 is connected to the contents distribution server 300, and requests a location of the contents, and receives the location of the contents from the contents distribution server 300.

Thereafter, based on the location of the contents received from the contents distribution server 300, the user device 200 requests the contents of the contents managing server 400 that stores the contents. The user device 300 receives the contents from the contents managing server 400.

As described above, the user device 200 is directly connected to the contents distribution server 300. However, if there is a separate web server (not illustrated), to which the user device 200 is connected in order to use contents, the user device 200 may be connected to the contents distribution server 300 through the separate web server (not illustrated).

Accordingly, in addition to the direct connection between the user device 200 and the contents distribution server 300, the indirect connection between the user device 200 and the contents distribution server 300 through the separated web server (not illustrated) is also understood as the connection between the user device 200 and the contents distribution server 300.

The user device 200 may include wireless communication devices assuring portability and mobility, such as a mobile phone, a smart phone, a personal digital assistant (PDA) phone, and a notebook type computer. Also, the user device 200 may include all types of handheld-based wireless communication devices that are connected to the contents distribution server 300 through a network.

The user device 200 may be connected to the contents distribution server 300 through a RFID, a QR-CODE, a USN, and other modes of communication.

When the registration device 100 is connected to the contents distribution server 300 to request registration of contents, the contents distribution server 300 provides an interface for the registration of the contents to the registration device 100.

Thereafter, the contents distribution server 300 receives 'input information' for the registration of the contents from the registration device 100, and extracts code information for generating an identification code from the received input information.

The contents distribution server 300 combines codes corresponding to the extracted code information to generate a first identification code group and a second identification code group. The identification code may include the first identification code group and the second identification code group.

Here, the first identification code group includes at least one of available device information for the contents, personal identification information, kind information of the contents and location information on the contents managing server storing the contents. The first identification code group may include information on an entity that manages a code.

Hereinafter, the first identification code group will be referred to as a "meta code".

The second identification code group includes information about at least one of country information, territory information, company information where the contents are produced, contents provider information on a contents provider which provides the registered contents, and contents identification information. The second identification code group may further include a meaning-based code like an EPC, a SGTIN, and a Mobile RFID Code.

Hereinafter, the second identification code group will be referred to as a "meaning-based code".

The identification code generated in the contents distribution server 300 will be explained in detail later with reference to FIG. 6.

After generating the identification code for the contents, the contents distribution server 300 transmits the contents to the contents managing server 400 with reference to the meta code included in the identification code.

The contents distribution server 300 receives a request signal for location of the contents from the user device 200, and analyzes an identification code included in the request signal.

That is, the contents distribution server 300 analyzes the meta code and the meaning-based code included in the identification code included in the request signal. Based on the analysis results, the contents distribution server 300 transmits the location where the contents corresponding to the request signal are stored, i.e., information on the contents managing server 400 storing the contents corresponding to the request signal to the user device 200.

The contents managing server 400 receives a request for transmission of the contents from the user device 200. The contents managing server 400 searches the contents and transmits the contents to the user device 200.

Figure 2:
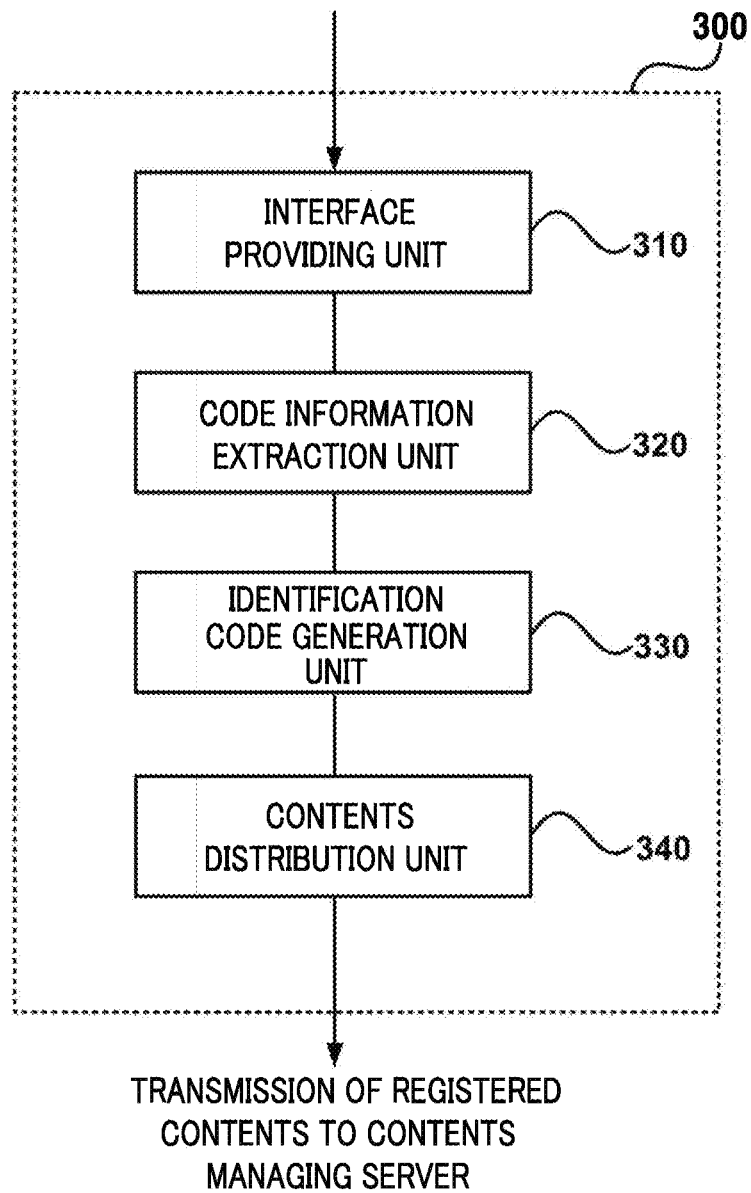
FIG. 2 is a block diagram illustrating a configuration of an apparatus using an identification code according to an exemplary embodiment.

FIG. 2 is a block diagram illustrating configuration of an apparatus using an identification code according to an exemplary embodiment.

The apparatus using an identification code according to an exemplary embodiment may be included in the contents distribution server 300. Hereinafter, the contents distribution server 300 will be described as the apparatus using an identification code according to an exemplary embodiment.

The contents distribution server 300 according to an exemplary embodiment includes an interface providing unit 310, a code information extraction unit 320, an identification code generation unit 330, and a contents distribution unit 340.

With regard to each of components, when the registration device 100 is connected to the contents distribution server 300 to request registration of contents, the interface providing unit 310 provides an interface for registration of the contents to the registration device 100.

Based on input information received from the registration device 100 through the interface, the code information extraction unit 320 extracts code information for generating an identification code.

The identification code generation unit 330 generates the identification code by combining codes corresponding to the extracted code information. The identification code generation unit 330 may assign a bit length for kind information based on the number of categories of contents.

The identification code will be described in detail later with reference to FIG. 6.

Based on the identification code generated in the identification code generation unit 330, in particular, the meta code included in the identification code, the contents distribution unit 340 matches the contents with the generated identification code and registers the matched contents in a database (not illustrated) and transmits the registered contents to the contents managing server 400 with reference to the identification code.

In this case, the contents distribution unit 340 may store 'location information', which includes a name, an IP address, a port number, URL, and others of the contents managing server 400 storing the contents in a separated storage unit (not illustrated).

The contents managing server 400 may store the contents together with the identification code for the contents.

Figure 3:
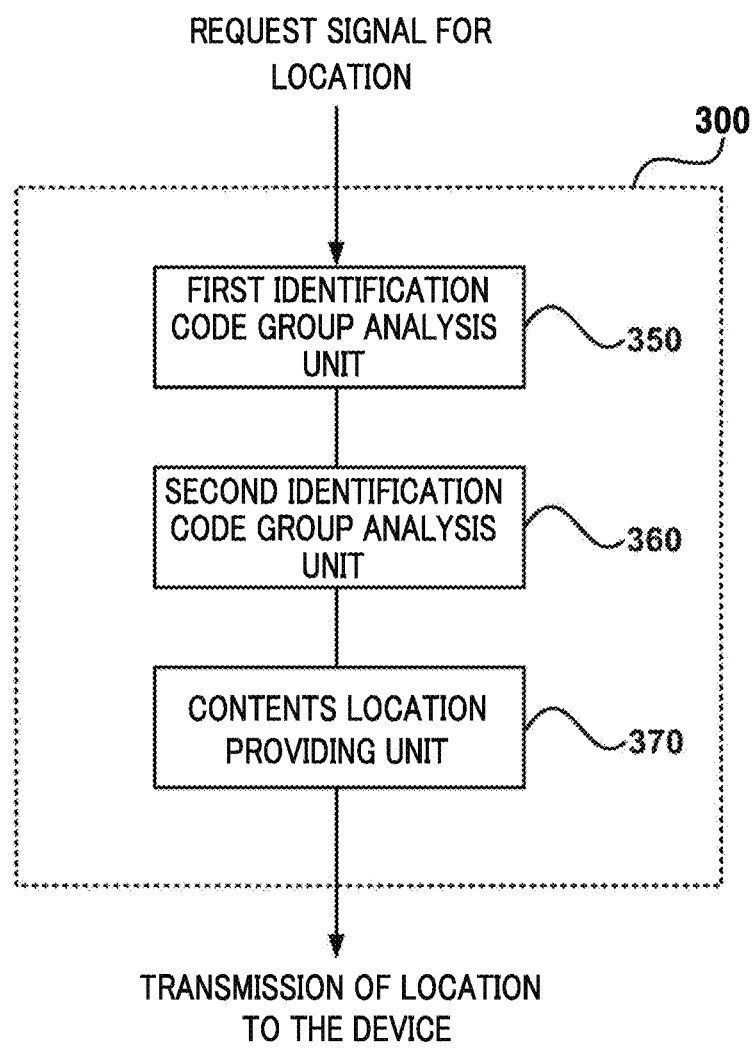
FIG. 3 is a block diagram illustrating a configuration of an apparatus for providing a location of contents by using an identification code according to an exemplary embodiment.

FIG. 3 is a block diagram illustrating a configuration of an apparatus for providing a location of contents by using an identification code according to an exemplary embodiment.

The apparatus for providing a location of contents by using an identification code according to an exemplary embodiment may be included in the contents distribution server 300. Hereinafter, the contents distribution server 300 will be described as the apparatus for providing a location of contents by using an identification code according to an exemplary embodiment.

The contents distribution server 300 according to an exemplary embodiment includes a first identification code group analysis unit 350, a second identification code group analysis unit 360, and a contents location providing unit 370.

With regard to each of components, when receiving a request signal for a location of the contents from the user device 200, the first identification code group analysis unit 350 extracts a first identification code group included in the request signal, i.e., a meta code, and analyzes the first identification code group included in the request signal.

The first identification code group included in the request signal includes at least one of available device information for contents, personal identification information and kind information of the contents. The first identification code group analysis unit 350 compares the first identification code group included in the request signal with identification codes stored in the database (not illustrated), finds location information on the contents managing server 400 storing the contents based on the comparison, and transmits the location information to the contents location providing unit 370.

The second identification code group analysis unit 360 extracts a second identification code group included in the request signal, i.e., a meaning-based code, and analyzes the second identification code group included in the request signal.

The second identification code group included in the request signal includes at least one of country information, territory information, company information where the contents are produced, and contents provider information on a contents provider which provides the contents. The second identification code group analysis unit 360 compares the second identification code group included in the request signal with identification codes stored in the database (not illustrated), finds contents identification information based on the comparison, and transmits the contents identification information to the contents location providing unit.

The second identification code group analysis unit 360 may exist by available device information for contents, kind information of the contents or an organization managing the contents.

For example, there may be a second identification code group analysis unit (not illustrated), which processes contents provided to a mobile device. There may be a second identification code group analysis unit (not illustrated), which processes contents provided to a set-up box for IPTV services.

The contents location providing unit 370 searches a location of the contents based on the analyzed first identification code group and the analyzed second identification code group, and transmits the location to the device 200.

For reference, the components illustrated in FIG. 2 and FIG. 3 according to an exemplary embodiment may imply software or hardware such as a field programmable gate array (FPGA) or an application specific integrated circuit (ASIC), and carry out certain functions.

However, the components are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables and the like.

The components and functions thereof can be combined with each other or can be divided.

Figure 4:
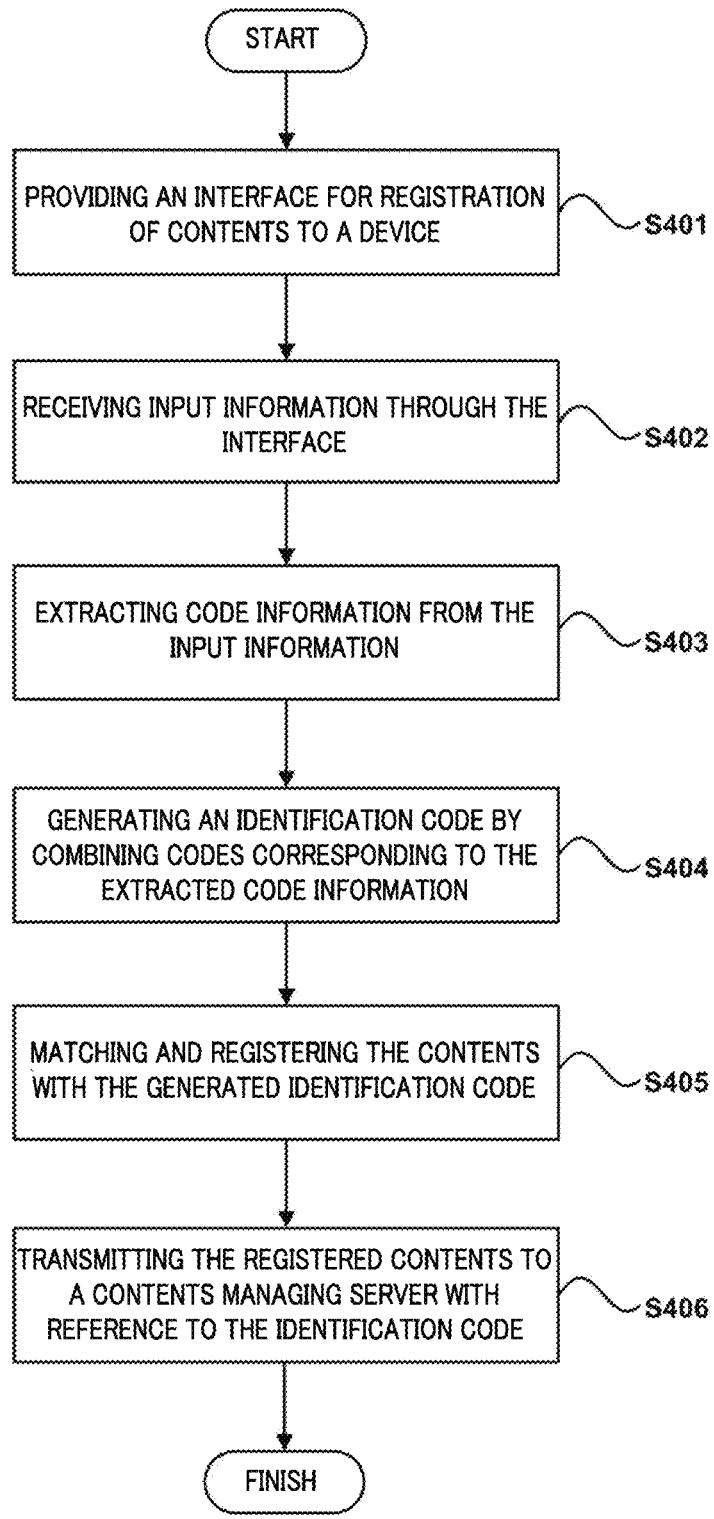
FIG. 4 is a flow chart illustrating a contents registration process according to an exemplary embodiment.

FIG. 4 is a flow chart illustrating a contents registration process according to an exemplary embodiment.

Hereinafter, the flow chart illustrated in FIG. 4 will be explained with reference to the configuration of the system illustrated in FIG. 1.

In operation S401, when the registration device 100 is connected to the contents distribution server 300 to request registration of contents, the contents distribution server 300 provides an interface for the registration of the contents to the registration device 100.

In operation S402, the contents distribution server 300 receives input information from the registration device 100 through the interface.

In operation S403, the contents distribution server 300 extracts code information for generating identification code from the input information.

In operation S404, the contents distribution server 300 generates an identification code including a first identification code group and a second identification code group by combining codes corresponding to the extracted code information.

In operation S405, the contents distribution server 300 matches and registers the contents with the identification code generated in S404.

In operation S406, the contents distribution server 300 transmits the registered contents to the contents managing server 400 with reference to the identification code generated in operation S404.

Figure 5:
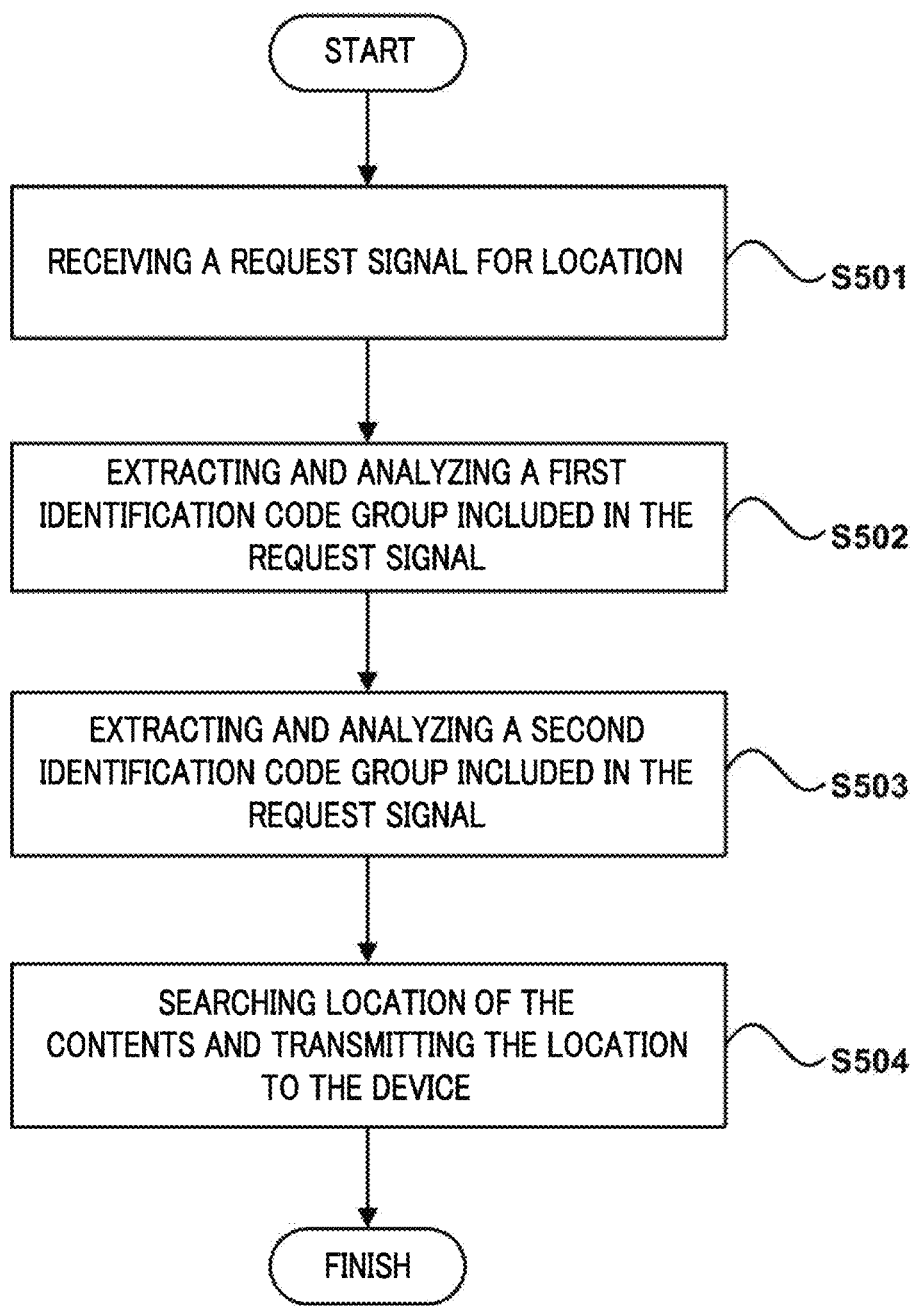
FIG. 5 is a flow chart illustrating a contents search process according to an exemplary embodiment.

FIG. 5 is a flow chart illustrating a contents search process according to an exemplary embodiment.

Hereinafter, the flow chart illustrated in FIG. 4 will be explained with reference to the configuration of the system illustrated in FIG. 1.

In operation S501, when the user device 200 is connected to the contents distribution server 300 to request a location of contents, the contents distribution server 300 receives a request signal for the location of the contents from the user device 200.

In operation S502, the contents distribution server 300 extracts and analyzes a first identification code group included in the request signal, i.e., a meta code.

In operation S503, the contents distribution server 300 extracts and analyzes a second identification code group included in the request signal, i.e., a meaning-based code.

In operation S504, the contents distribution server 300 searches a location of the contents, and transmits the location of the contents to the user device 200.

Figure 6:
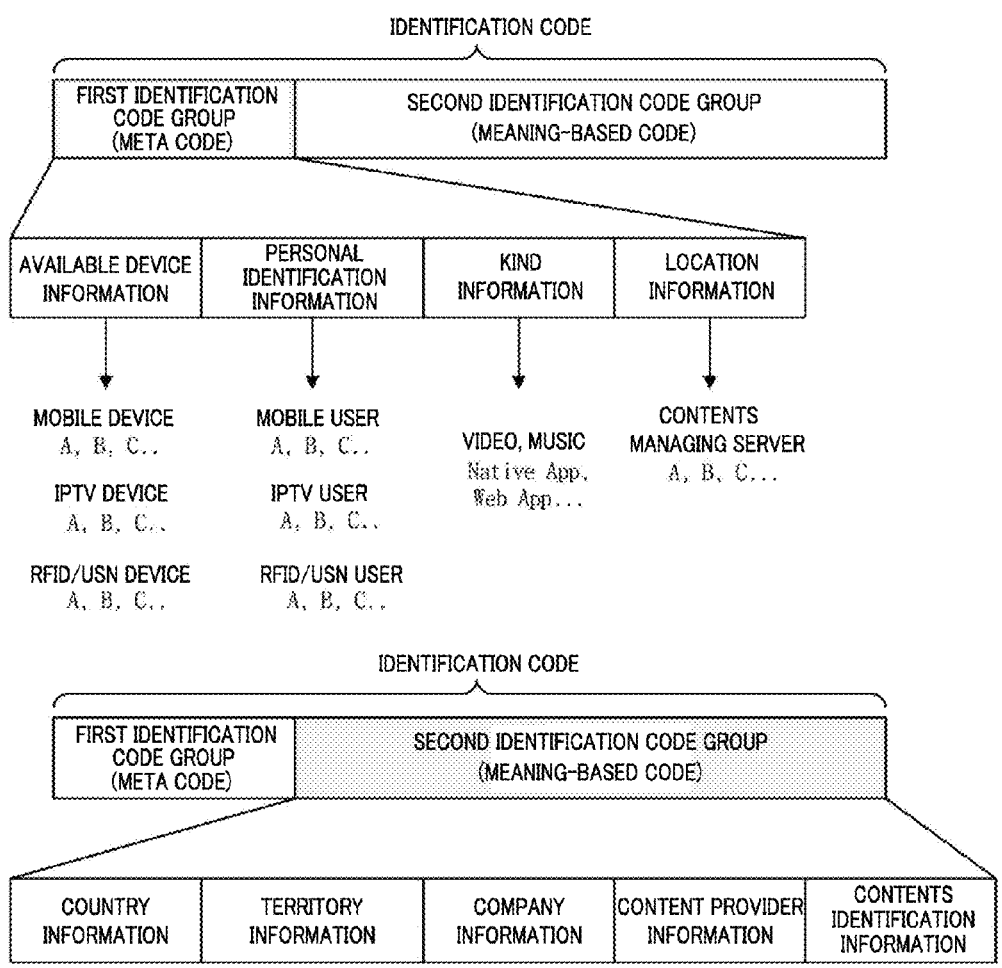
FIG. 6 illustrates configuration of a meta code according to an exemplary embodiment.

FIG. 6 illustrates configuration of a meta code according to an exemplary embodiment.

A first identification code group, i.e., a meta-code may have information for distinguishing a meaning-based code (e.g., an electronic product code (EPC), a serialized global trade item number (SGTIN), and a Mobile RFID Code). The first identification code group may include basic information including available device information for contents and personal identification information, kind information of the contents and information on an organization managing the contents.

Here, the available device information for contents includes information for providing customized contents to a corresponding device or information for a numerous screen (N-screen) cooperation service. The available device information identifies each device, and a code corresponding to the device is assigned to the available device information. The personal identification information includes information for personal customization and includes a code for information on a user corresponding to the user device 200.

The kind information of the contents include header information, from which types of contents such as a video, a sound source, Native App, and Web App can be identified. A bit length may be assigned in consideration of the number of categories.

The organization managing the contents is information to identify location information on a contents managing server possessing the contents, i.e., an organization actually providing contents.

Various meaning-based codes can be analyzed by using the second identification code group. Even if the second identification code group of contents is added or modified, the user device 200 can be provided with the contents by matching with the first identification code group.

The illustrative embodiments can be embodied in a storage medium including instruction codes executable by a computer or processor such as a program module executed by the computer or processor. A data structure in accordance with the illustrative embodiments can be stored in the storage medium executable by the computer or processor. A computer readable medium can be any usable medium which can be accessed by the computer and includes all volatile/non-volatile and removable/non-removable media. The computer readable medium may be implemented via hardware or software. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the illustrative embodiments is provided for the purpose of illustration, and it would be understood by those skilled in the art that various changes and modifications may be made without changing the technical conception and features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

Exemplary embodiments are defined by the following claims and their equivalents rather than by the detailed description of the illustrative embodiments. It shall be understood that all modifications and exemplary embodiments conceived from the meaning and scope of the claims and their equivalents are included in the scope of the inventive concept.

What is claimed is:

1. A contents distribution server using an identification code of contents, the contents distribution server comprising:
   an interface providing unit configured to provide an interface for registration of the contents to a device if a request for the registration of the contents is received from the device;
   a code information extraction unit configured to extract code information from input information through the interface;
   an identification code generation unit configured to generate the identification code by combining codes corresponding to the extracted code information, the identification code generation unit further assigns a bit length for a kind information of the registered contents based on a number of categories;
   a contents distribution unit configured to match the contents with the generated identification code, register the matched contents in a database, and transmit the registered contents to a contents managing server among a plurality of contents managing servers with reference to the identification code;
   an identification code group analysis unit configured to extract and analyze a first identification code group and a second identification code group included in a request signal; and
   a contents location providing unit configured to search the location of the contents based on the analyzed first identification code group and the analyzed second identification code group, and transmit the location to a client device,
   wherein the contents distribution server receives, from the client device, the request signal requesting location information related to the contents managing server that has the registered contents,
   wherein the client device requests the registered contents from the contents managing server based on a response to the request signal, the response being received from the contents distribution server,
   wherein the identification code is a string of codes including the first identification code group and the second identification code group, the first identification code group being meta code and the second identification code group being meaning-based code,
   wherein the second identification code group is different from the first identification code group,
   wherein the meta code includes at least available device information for the registered contents, personal identification information, the kind information of the registered contents and location information on the contents managing server storing the registered contents,
   wherein the available device information for the registered contents comprises at least one of information for providing customized contents to the device and information for a numerous screen cooperation service, wherein the meaning-based code includes at least two of country information, territory information, and contents provider information on a contents provider which provides the registered contents, and wherein the contents managing server is determined from among a plurality of content managing servers based on the meta code and the meaning-based code included in the identification code.

2. The contents distribution server of claim 1, wherein the interface includes at least one from among a plurality of check boxes to be selected and input boxes into which information is input.

3. The contents distribution server of claim 1, wherein the location information includes at least one from among a name, an Internet protocol (IP) address, a port number, and uniform resource locator (URL) of the contents managing server.

4. A computer-implemented method for providing contents by using an identification code of the contents, the method comprising:

extracting code information from input information when receiving the input information from a registration device for registration of the contents, and generating the identification code by combining codes corresponding to the extracted code information;

assigning a bit length for a kind information of the registered contents based on a number of categories;

matching the contents with the generated identification code, registering the matched contents in a database, and transmitting the registered contents to a contents managing server with reference to the identification code;

receiving, from a client device, a request signal requesting location information related to the contents managing server that has the registered contents, wherein the client device requesting the registered contents from the contents managing server based on a response to the request signal, the response being received from the contents distribution server, extracting and analyzing, by using an identification code group analysis unit, a first identification code group and a second identification code group included in the request signal; and searching, by using a contents location providing unit, the location of the contents based on the analyzed first identification code group and the analyzed second identification code group, and transmitting the location to the client device, wherein the identification code is a string of codes comprising the first identification code group and the second identification code group, the first identification code group being meta code and the second identification code group being meaning-based code, wherein the second identification code group is different from the first identification code group, wherein the meta code includes at least available device information for the registered contents, personal identification information, the kind information of the registered contents and location information on the contents managing server storing the registered contents, wherein the available device information for the registered contents comprises at least one of information for providing customized contents to the available device and information for a numerous screen cooperation service, wherein the meaning-based code includes at least two of country information, territory information, and contents provider information on a contents provider which provides the registered contents, and the method further comprising determining the contents managing server from among a plurality of content managing servers based on the meta code and the meaning-based code included in the identification code.

\* \* \* \* \*